(12) United States Patent
Akahori et al.

(10) Patent No.: US 10,666,100 B2
(45) Date of Patent: May 26, 2020

(54) SPINDLE MOTOR, HARD DISK DRIVE DEVICE, AND METHOD OF MANUFACTURING SPINDLE MOTOR

(71) Applicant: MINEBEA MITSUMI Inc., Nagano (JP)

(72) Inventors: Tadashi Akahori, Kitasaku (JP);
Akihiko Suzuki, Kitasaku (JP);
Makoto Chonan, Komoro (JP)

(73) Assignee: MINEBEA MITSUMI INC., Nagano (JP)

( * ) Notice: Subject to any disclaimer, the term of this patent is extended or adjusted under 35 U.S.C. 154(b) by 70 days.

(21) Appl. No.: 15/795,514

(22) Filed: Oct. 27, 2017

(65) Prior Publication Data

US 2018/0123413 A1 May 3, 2018

(30) Foreign Application Priority Data

Oct. 31, 2016 (JP) ................. 2016-213549

(51) Int. Cl.
| | | |
|---|---|---|
| *H02K 1/28* | (2006.01) | |
| *H02K 11/40* | (2016.01) | |
| *H02K 5/16* | (2006.01) | |
| *H02K 11/00* | (2016.01) | |
| *H02K 7/09* | (2006.01) | |
| *G11B 19/20* | (2006.01) | |
| *H02K 1/27* | (2006.01) | |
| *H02K 15/03* | (2006.01) | |

(52) U.S. Cl.
CPC .......... *H02K 1/28* (2013.01); *G11B 19/2036* (2013.01); *H02K 1/2753* (2013.01); *H02K 5/163* (2013.01); *H02K 7/09* (2013.01); *H02K 11/0094* (2013.01); *H02K 11/40* (2016.01); *H02K 15/03* (2013.01); *H02K 2205/03* (2013.01)

(58) Field of Classification Search
CPC ............ H02K 1/28; H02K 1/27; H02K 15/03; H02K 7/04; H02K 21/22; H02K 5/24; G11B 19/20; G11B 19/2009; G11B 17/02
USPC ...................................... 310/67 R
See application file for complete search history.

(56) References Cited

U.S. PATENT DOCUMENTS

| | | | | |
|---|---|---|---|---|
| 8,339,733 | B2 * | 12/2012 | Ikegawa | G11B 19/2009 29/603.03 |
| 8,946,953 | B2 * | 2/2015 | Kim | G11B 19/2009 310/51 |
| 2009/0174272 | A1 * | 7/2009 | Yoneda | G11B 19/2009 310/156.04 |

(Continued)

FOREIGN PATENT DOCUMENTS

| | | |
|---|---|---|
| JP | 2008-109793 A | 5/2008 |
| JP | 5309837 B2 | 7/2013 |
| JP | 5343543 B2 | 8/2013 |

*Primary Examiner* — Alfonso Perez Borroto
*Assistant Examiner* — Leda T Pham
(74) *Attorney, Agent, or Firm* — Pearne & Gordon LLP

(57) ABSTRACT

A spindle motor according to an embodiment includes a base plate, a rotor magnet fixed to a rotor assembly positioned at one surface side of the base plate and a magnetic attraction plate fixed at the one surface side of the base plate so as to face the rotor magnet. An opposite area of the base plate facing the magnetic attraction plate includes a coated area covered by an epoxy electric discharge coating film, and the magnetic attraction plate is fixed to the opposite area via at least one of an epoxy adhesive and an acrylic adhesive.

12 Claims, 10 Drawing Sheets

(56) References Cited

U.S. PATENT DOCUMENTS

2010/0142359 A1* 6/2010 Sakata ............... G11B 19/2009
                                                        369/270.1

* cited by examiner

SPINDLE MOTOR, HARD DISK DRIVE DEVICE, AND METHOD OF MANUFACTURING SPINDLE MOTOR

CROSS-REFERENCE TO RELATED APPLICATION(S)

The present application claims priority to and incorporates by reference the entire contents of Japanese Patent Application No. 2016-213549 filed in Japan on Oct. 31, 2016.

BACKGROUND OF THE INVENTION

1. Field of the Invention

The present invention relates to a spindle motor, a hard disk drive device, and a method of manufacturing the spindle motor.

2. Description of the Related Art

In a spindle motor, a magnetic attraction plate is used for stabilization of rotation of a hub and the like fixed to a shaft. The magnetic attraction plate is bonded and fixed to a base plate.

A metal surface of the base plate is subjected to cutting, and a flat surface (cut surface) is formed. A configuration in which the cut surface and the magnetic attraction plate are bonded together has been known (see, for example, specification of Japanese Patent No. 5309837, specification of Japanese Patent No. 5343543, and Japanese Unexamined Patent Application Publication No. 2008-109793).

The above configuration has a problem that bonding strength of the adhesive is reduced by an oxide film or the like formed on the cut surface, and the magnetic attraction plate may separate due to vibration, impact, temperature stress, or the like.

SUMMARY OF THE INVENTION

It is an object of the present invention to at least partially solve the above problem in the conventional technology.

A spindle motor according to an embodiment includes a base plate, a rotor magnet fixed to a rotor assembly positioned at one surface side of the base plate, and a magnetic attraction plate fixed at the one surface side of the base plate so as to face the rotor magnet. An opposite area of the base plate facing the magnetic attraction plate includes a coated area covered by an epoxy electric discharge coating film, and the magnetic attraction plate is fixed to the opposite area via at least one of an epoxy adhesive and an acrylic adhesive.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a spindle motor, a hard disk drive device, and a method of manufacturing the spindle motor, according to embodiments, will be described by reference to the drawings.

First Embodiment

First of all, an overall configuration of a spindle motor according to an embodiment will be described with reference to FIG. 1 and FIG. 2. The present invention is not limited to the following embodiments. Further, components in the following embodiments include those easily substitutable by persons skilled in the art or those that are substantially the same. Furthermore, hereinafter, terms such as "upper" and "lower", will just be used for indication of directions in the respective drawings, and do not limit positions in the spindle motor according to the embodiments.

Figure 1:
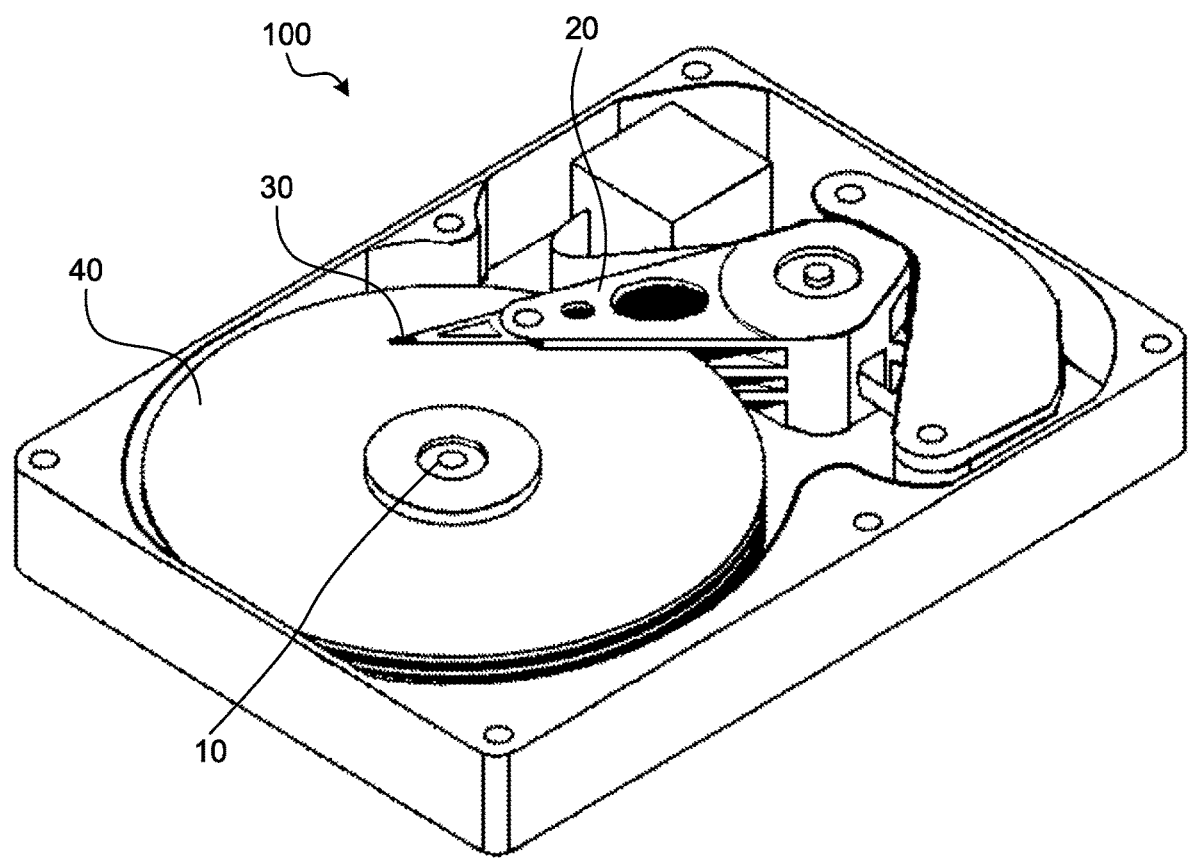
FIG. 1 is a perspective view illustrating a configuration of a hard disk drive device including a spindle motor according to an embodiment.

FIG. 1 is a perspective view illustrating a configuration of a hard disk drive device 100 including a spindle motor 10 according to an embodiment. This hard disk drive device 100 includes, as illustrated in FIG. 1, the spindle motor 10, an actuator 20, a magnetic head 30, a platter (disk) 40, and a cover (not shown) that covers the spindle motor 10, the actuator 20, the magnetic head 30, and the platter 40.

The platter 40 is a data recording part of the hard disk drive device 100, and has a flat disk shape. The platter 40 is formed of, for example, A5086 series aluminum alloy, and a magnetic coating film for recording is coated on a surface of the platter 40. The magnetic head 30 accessing a specified position of the platter 40 by control of the actuator 20 performs reading and writing of information with respect to the platter 40. The platter 40 rotates during the reading and writing. The platter 40 is fixed to an outer periphery of a rotor hub 120 (see FIG. 2) that is a component of the spindle motor 10, and by drive of the spindle motor 10, rotation of the platter 40 is controlled. The spindle motor 10 has, for example, a fluid bearing mechanism, and this fluid bearing mechanism supports load of the platter 40 while rotating the platter 40. Air or gas causing resistance lower than that of air may be enclosed inside the hard disk drive device 100. Further, a closed space to accommodate inside the spindle motor 10, the platter 40 and the magnetic head 30 is formed by a base plate 140 (see FIG. 2) and the cover.

Figure 2:
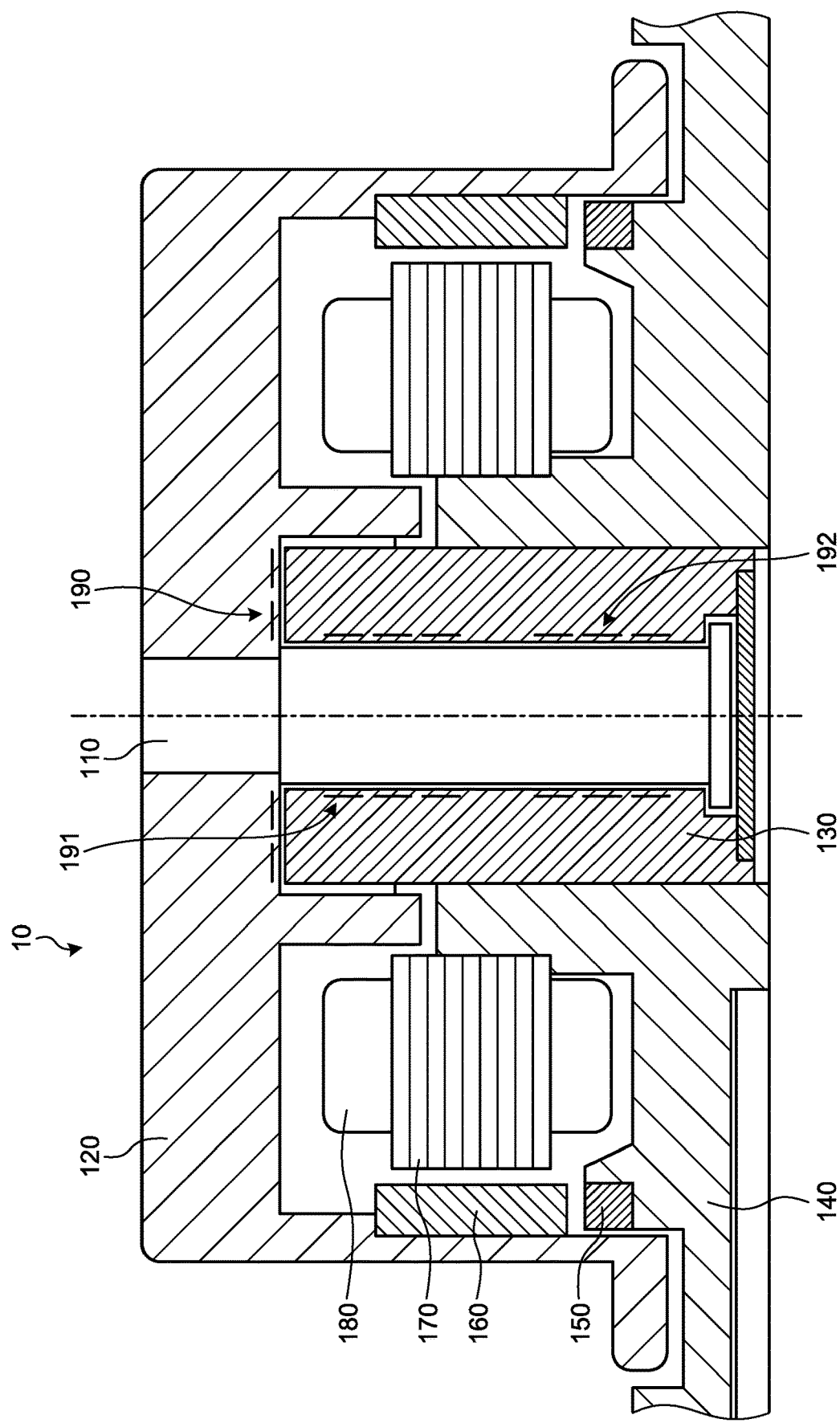
FIG. 2 is a sectional view illustrating a configuration of the spindle motor according to the embodiment.

FIG. 2 is a sectional view illustrating a configuration of the spindle motor 10 according to the embodiment. The spindle motor 10 is configured to include a stationary portion and a rotary portion that rotates relatively to the stationary portion via a fluid dynamic pressure bearing mechanism. In FIG. 2, the stationary portion includes the base plate 140, a sleeve 130, a stator core 170 and a magnetic attraction plate 150. A coil 180 is wound around pole teeth of the stator core 170. Further, the rotary portion includes a shaft 110, the rotor hub 120 and a rotor magnet 160. In FIG. 2, an example of a rotating shaft type spindle motor, in which the shaft 110 rotates, is illustrated. However, a fixed shaft type spindle motor may also be suitably adopted.

The shaft 110 is rotatably supported with respect to the sleeve 130. A lubricating fluid fills a gap between an outer peripheral surface of the shaft 110 and an inner peripheral surface of the sleeve 130.

The rotor hub 120 is fixed to an upper end portion of the shaft 110. The rotor hub 120 is formed of, for example, A6061-T6 aluminum alloy. The rotor hub 120 has a circular top plate portion and a cylindrical wall suspended from an outer peripheral edge of the top plate portion. A disk placement portion protruding in a radial direction is provided on an outer peripheral surface of the cylindrical wall and the platter 40 is placed on the disk placement portion.

Further, on an inner peripheral surface of the cylindrical wall of the rotor hub 120, a ring shaped rotor magnet 160, which has a magnetic pole structure magnetized in a state where polarity is alternated like N, S, N, S, and so on in a circumferential direction thereof, is fixed. The base plate 140 is a member for forming the stationary portion. On a circumferential wall portion of the base plate 140, the stator core 170 is fixed at a position facing the rotor magnet 160 via a gap in the radial direction. Further, a bearing supporting hole is formed in the base plate 140. As illustrated in FIG. 2, at a side of a surface of the base plate 140 facing the rotor magnet 160 in an axial direction, the magnetic attraction plate 150 is fixed to face the rotor magnet 160. Hereinafter the surface facing the rotor magnet 160 will be referred to as "one surface". It is noted that "one surface" in the embodiments is not limited to the surface axially opposite to the rotor magnet 160. An example of the "one surface" may include surfaces of the base plate 140 other than the surface axially opposite to the rotor magnet 160. Also, hereinafter the side of "one surface" will be referred to as "one surface side". The magnetic attraction plate 150 is a member that stabilizes rotation of the rotor hub 120, and is formed of, for example, a magnetic material. The stator core 170 has a function of generating a magnetic flux according to driving current supplied to the coil 180. When electric current flows in the coil 180, magnetic attraction force and magnetic repulsion force generated between magnetic poles of the rotor magnet 160 and the pole teeth of the stator core 170 are switched over, and the rotary portion including the rotor magnet 160, the rotor hub 120 and the shaft 110 rotates with respect to the base plate 140.

The sleeve 130 is a substantially ring shaped member fixed in the bearing supporting hole of the base plate 140 and supports the shaft 110. A radial dynamic pressure generating groove is formed on at least one of the inner peripheral surface of the sleeve 130 and the outer peripheral surface of the shaft 110. FIG. 2 shows an example in which an upper radial dynamic pressure groove 191 and a lower radial dynamic pressure groove 192 are formed on the inner peripheral surface of the sleeve 130.

Further, a thrust dynamic pressure groove is formed on at least one of an upper end surface of the sleeve 130 and a portion of a lower surface of the top plate portion of the rotor hub 120 facing the upper end surface of the sleeve 130. FIG. 2 also shows an example in which a thrust dynamic pressure groove 190 is formed in the portion of the lower surface of the top plate portion of the rotor hub 120 facing the upper end surface of the sleeve 130.

Next, a method of manufacturing the spindle motor 10 according to the embodiment, and a bonding configuration between the base plate 140 and the magnetic attraction plate 150 will be described with reference to FIG. 3 to FIG. 7.

Figure 3:
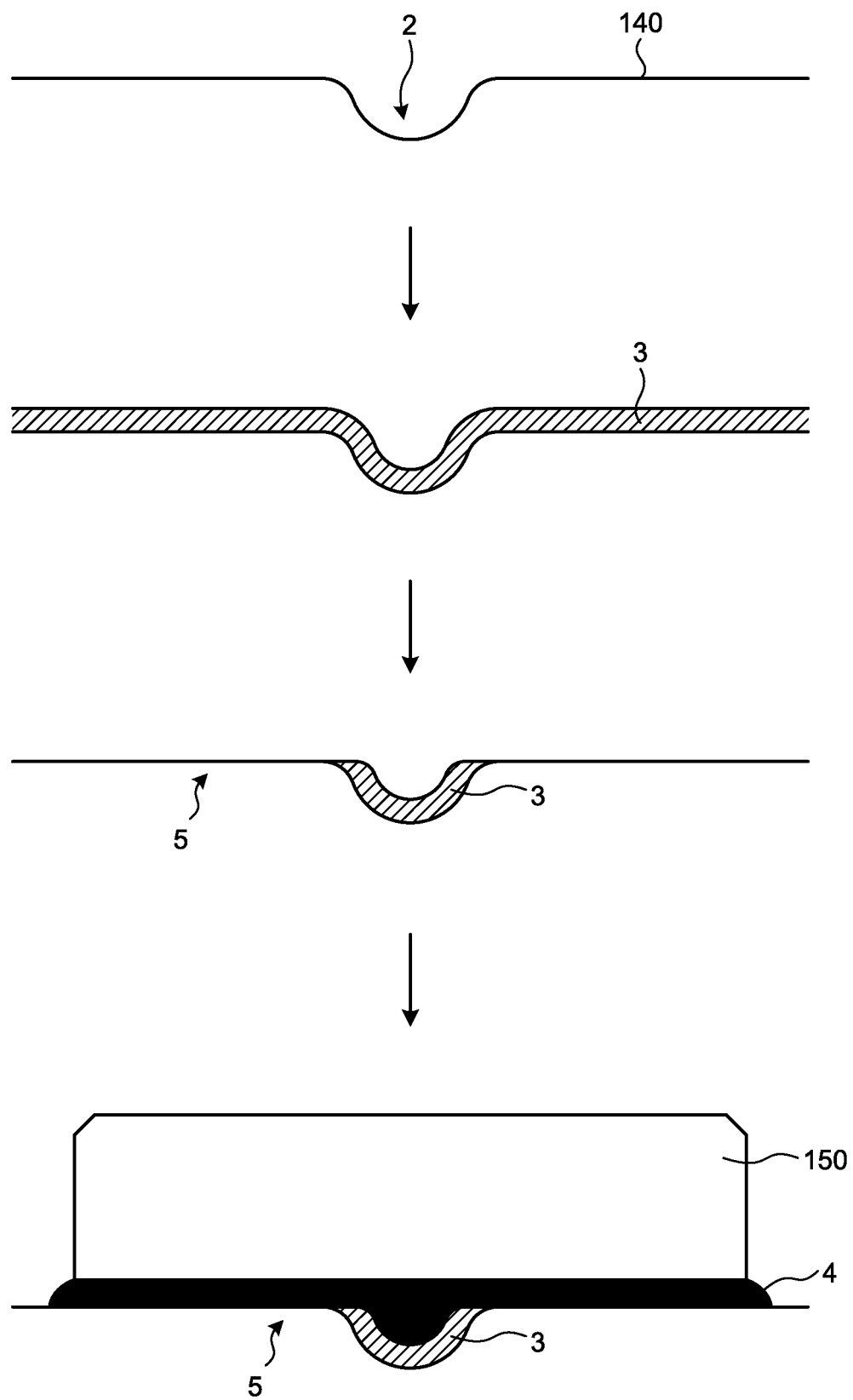
FIG. 3 illustrates a method of manufacturing a spindle motor according to a first embodiment.
Figure 4:
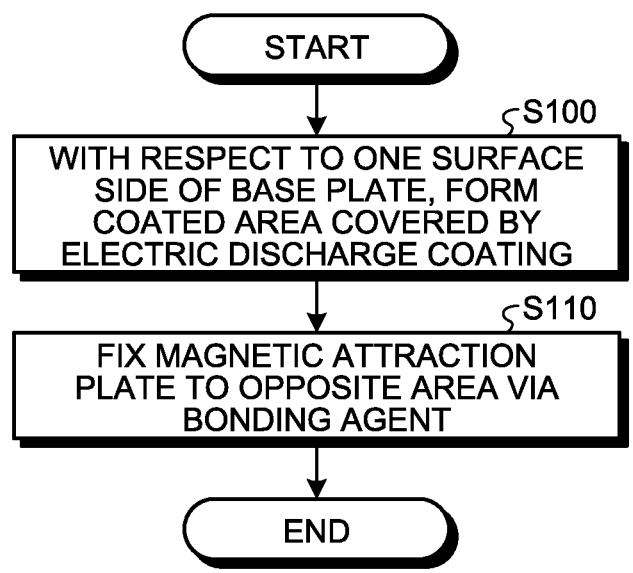
FIG. 4 is a flow chart illustrating the method of manufacturing the spindle motor according to the first embodiment.
Figure 5:
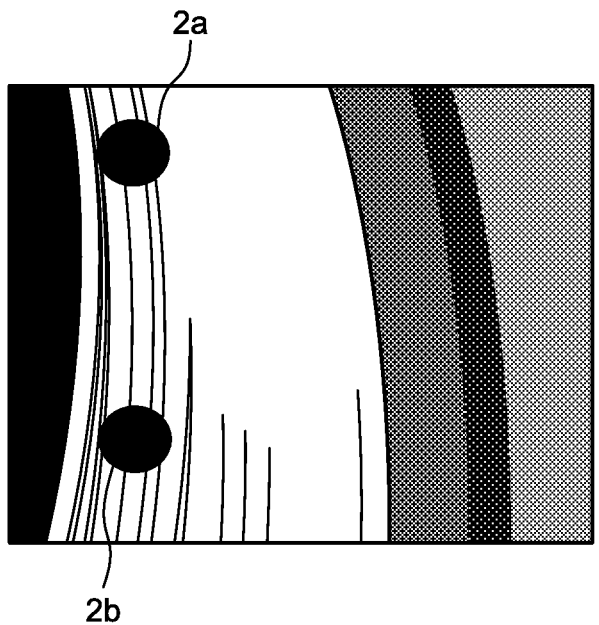
FIG. 5 illustrates an example of recessed portions formed on one surface of a base plate, according to the first embodiment.
Figure 6:
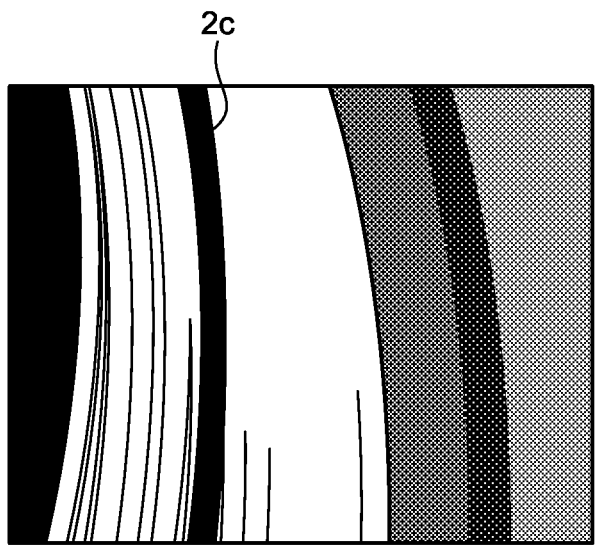
FIG. 6 illustrates an example of a recessed portion formed on the one surface of the base plate, according to the first embodiment.

FIG. 4 is a flow chart illustrating the method of manufacturing the spindle motor according to the first embodiment. As the premise of the flow chart in FIG. 4, one or more recessed portions 2 are formed on the one surface of the base plate 140. At the uppermost stage in FIG. 3, an example of the recessed portion 2 formed on the one surface of the base plate 140 is illustrated. The recessed portion 2 is formed by, for example, die casting. As exemplified by a recessed portion 2a and a recessed portion 2b in FIG. 5, plural recessed portions may be formed separately from one another on the one surface of the base plate 140, or as exemplified by a recessed portion 2c in FIG. 5, one recessed portion may be formed as a circumferential groove forming a circle on the one surface of the base plate 140.

As illustrated in FIG. 4, at Step S100, electric discharge (ED) coating is carried out on an area including the recessed portion 2, and as illustrated at the second stage from the top in FIG. 3, the recessed portion 2 is covered by a coating film 3. At the second stage from the top in FIG. 3, the coating film 3 coated on the base plate 140 is illustrated. Electric discharge coating is a coating method of causing a coating material to adhere to a surface of an object by causing a water-soluble coating material charged with positive or negative ions to adhere to a metal surface with direct current followed by the steps such as washing and drying. Advantages of electric discharge coating include uniform and good coated surfaces and an excellent effect as base coating since osmotic force is strong and good anti-corrosion performance is obtained for a portion covered by the coating material. Examples of coating materials used in electric discharge coating include, for example, epoxy coating materials. In this case, the recessed portion 2 is covered by the coating film 3 which is an epoxy electric discharge coating film. As a result, an opposite area of the base plate 140, which faces the magnetic attraction plate 150, includes a coated area covered by the epoxy electric discharge coating film. In other words, the recessed portion 2 is formed on the opposite area, and the coated area is formed on the recessed portion 2.

Subsequently, the one surface of the base plate 140 is subjected to cutting while the coating film 3 is being left on the recessed portion 2. The cutting is performed because high flatness is required to the one surface when the magnetic attraction plate 150 is bonded at the one surface side of the base plate 140. As illustrated at the third stage from the top in FIG. 3, after the cutting is carried out, a cut surface 5 is exposed on the one surface of the base plate 140. Hereinafter, a surface that has been exposed by cutting on one surface of the base plate 104 will be referred to as "cut surface" (exposed metal surface).

However, on the cut surface thus formed, an oxide film is formed. If an adhesive usually used such as an epoxy adhesive or an acrylic adhesive is coated on the cut surface after the oxide film has been formed, bonding strength decreases. Such decrease in the bonding strength may cause a problem such that the magnetic attraction plate 150 may be detached from the base plate 140 under a condition of impact, temperature stress, or the like. The bonding strength between the cut surface 5 and the adhesive 4 is lower than the bonding strength between the coating film 3 and the adhesive 4. Reasons for the difference in the bonding strengths are as follows. On the cut surface 5, a metal portion that has newly become a surface in the process of cutting reacts with oxygen in air, and an oxide film is formed on the cut surface 5. Superficial molecules of the cut surface 5 where the oxide film has been formed, are obstructed by the oxide film and become difficult to form hydrogen bonding (or covalent bonding) with molecules composing the adhesive 4. Therefore, surface free energy of the cut surface 5 hardly decreases and the bonding strength is lowered. Further, considering an example where the coating film 3 is an epoxy electric discharge coating film and the adhesive 4 is an epoxy adhesive, the bonding strength between the cut surface 5 and the adhesive 4 is lower because, as compared to molecules composing the epoxy electric discharge coating film, metal atoms of the cut surface 5 are difficult to form hydrogen bonding with molecules composing the epoxy adhesive. Furthermore, since similarity related to chemical properties between the molecules composing the epoxy electric discharge coating film and the molecules composing the epoxy adhesive is larger than chemical similarity between the metal atoms of the cut surface 5 and the molecules composing the epoxy adhesive, compared to the cut surface 5, intermolecular force acts strongly on the phase boundary which is the interface between the molecules composing the epoxy electric discharge coating film and the molecules composing the epoxy adhesive. As a result, the bonding strength between the adhesive 4 and the coating film 3 is increased. In other words, chemical affinity between the coating film 3, which is an epoxy resin, and the adhesive 4 is larger than chemical affinity between the cut surface 5 and the adhesive 4. Similarly, in a case where the coating film 3 is an epoxy electric discharge coating film and the adhesive 4 is an acrylic adhesive, chemical affinity between the coating film 3, which is an epoxy resin, and the adhesive 4 becomes larger than chemical affinity between the cut surface 5 and the adhesive 4. Since surface roughness of the coating film 3 is larger than that of the cut surface 5, the configuration is also advantageous for adsorption of the adhesive 4 due to the anchor effect, which contributes to make the bonding strength between the coating film 3 and the adhesive 4 higher than the bonding strength between the cut surface 5 and the adhesive 4.

Subsequently, at Step S110, the magnetic attraction plate 150 is bonded via the adhesive 4 to the coating film 3 on the recessed portion 2 corresponding to the coated area on the base plate 140, and the cut surface 5 exposed by metal cutting on the base plate 140 corresponding to the uncoated area on the base plate 140. In other words, a lower surface of the magnetic attraction plate is fixed to the opposite area of the base plate 140 including the coated area, that is, the opposite area including the recessed portion 2. An example of the adhesive 4 that may be used is an epoxy adhesive or an acrylic adhesive. As a result, the magnetic attraction plate 150 is fixed to the above described opposite area via at least one of the epoxy adhesive and the acrylic adhesive. The lowermost stage in FIG. 3 illustrates a state in which the magnetic attraction plate 150 is bonded to a bonded surface including the recessed portion 2 corresponding to the coated area on the base plate 140 and the cut surface 5 corresponding to the uncoated area on the base plate 140 via the adhesive 4.

Figure 7:
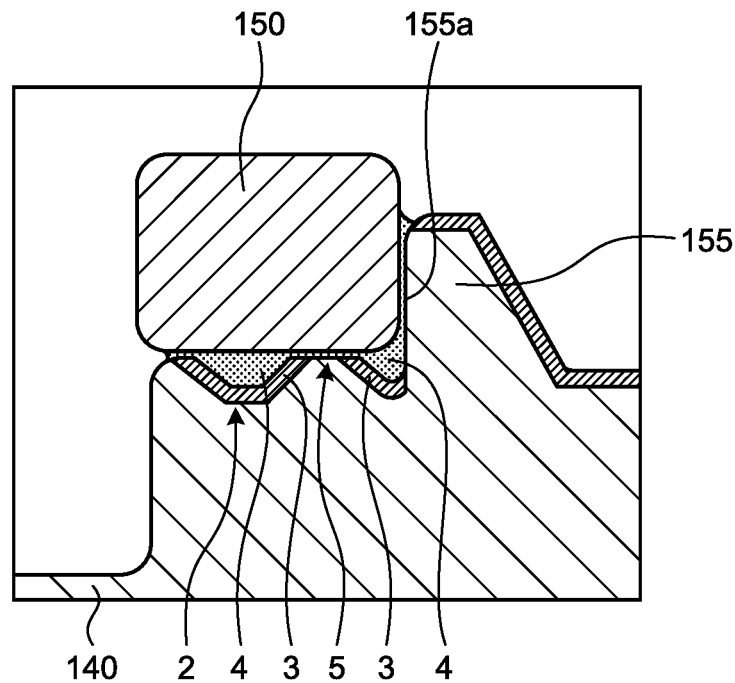
FIG. 7 illustrates a bonding configuration between the base plate and the magnetic attraction plate, according to the first embodiment.

That is, in the first embodiment, the spindle motor 10 according to the embodiment includes the base plate 140, the rotor magnet 160 fixed to a rotor assembly positioned at the one surface side of the base plate 140, and the magnetic attraction plate 150 fixed at the one surface side of the base plate 140 facing the rotor magnet 160 in the axial direction. The opposite area of the base plate 140, which faces the magnetic attraction plate 150, includes the coated area covered by an epoxy electric discharge coating film. The magnetic attraction plate 150 is fixed to the opposite area via at least one of an epoxy adhesive and an acrylic adhesive. The hard disk drive device 100 is configured to include this spindle motor 10. FIG. 7 illustrates the bonding configuration between the base plate 140 and the magnetic attraction plate 150 according to the first embodiment. As illustrated in FIG. 7, via the adhesive 4, the lower surface of the magnetic attraction plate 150 is bonded to the coating film 3 covering the recessed portion 2 formed on the one surface of the base plate 140 which is a surface where the magnetic attraction plate 150 is placed (for example, a magnetic attraction plate placement surface that is a part of the one surface of the base plate 140). As described above, the bonding strength between the coating film 3 and the adhesive 4 is high, and contributes to improve the bonding strength between the base plate 140 and the magnetic attraction plate 150, and thus the base plate 140 and the magnetic attraction plate 150 are strongly bonded to each other. As described before, unlike on the cut surface 5, since an oxide film is not formed on the area covered by the epoxy electric discharge coating film, the bonding strength between the adhesive and the bonded surface is improved by bonding the magnetic attraction plate 150 and the coating film having high chemical affinity to the adhesive. Similarly, the lower surface of the magnetic attraction plate 150 and the cut surface 5 formed on the magnetic attraction plate placement surface of the base plate 140 are also bonded together via the adhesive 4. Since the coating film having high chemical affinity to the epoxy adhesive or the acrylic adhesive contributes to improve the bonding strength, even if the cut surface is present on the base plate, the bonding strength between the adhesive and the bonded surface is improved. Since a recessed portion is not formed on a vertical wall surface 155a of a vertical wall portion 155 that is vertical to the magnetic attraction plate placement surface, the vertical wall surface 155a being a wall surface extending toward the rotor assembly along a rotation axis direction of the rotor assembly, the coating film 3 is removed therefrom by cutting. Although the adhesive 4 is interposed between the vertical wall surface 155a of the vertical wall portion 155 and a lateral surface of the magnetic attraction plate 150 in FIG. 7, the adhesive 4 between the vertical wall surface 155a and the lateral surface of the magnetic attraction plate 150 may be omitted.

The above described example exemplifies the configuration in which the cut surface is formed on the one surface side of the base plate 140 in addition to the coated area, and the magnetic attraction plate 150 is fixed to the opposite area including the cut surface. However, in addition to this example, also a configuration in which the magnetic attraction plate 150 is fixed only to the electric discharge coated area (for example, a configuration where the cutting of the base plate 140 is omitted) may be suitably adopted.

As described above, the spindle motor 10 according to the first embodiment can improve the bonding strength between the base plate 140 and the magnetic attraction plate 150.

Second Embodiment

In the first embodiment, the case with the recessed portion 2 and the coating film 3 provided on the magnetic attraction plate placement surface (horizontal surface) of the base plate 140 was described. In a second embodiment, a case in which the coating film 3 is provided on the vertical wall portion 155 of the base plate 140 facing the lateral surface of the magnetic attraction plate 150 will be described based on FIG. 8.

A method of manufacturing the spindle motor 10 according to the second embodiment will be described.

Figure 8:
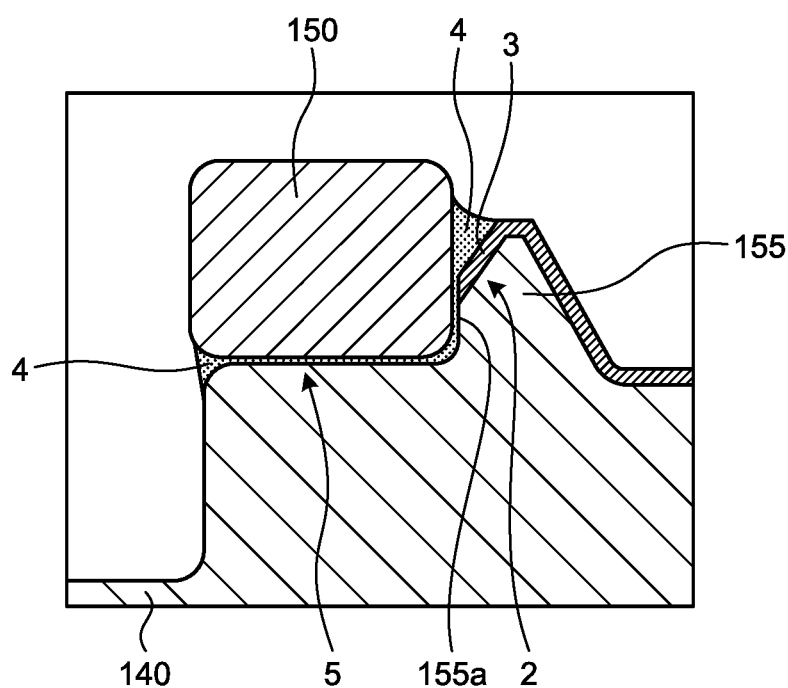
FIG. 8 illustrates a bonding configuration between a base plate and a magnetic attraction plate, according to a second embodiment.

Firstly, similarly to the first embodiment, one or more recessed portions are formed on one surface of the base plate 140. In the second embodiment, a wall surface (vertical wall surface 155a) that extends toward the rotor assembly along the rotation axis direction of the rotor assembly is formed at the one surface side of the base plate 140. The one surface of the base plate 140 includes the vertical wall surface 155a and the magnetic attraction plate placement surface which are the surfaces that face the rotor magnet 150. An opposite area on the wall surface (vertical wall surface 155a) includes a coated area covered by an epoxy electric discharge coated area. The lateral surface of the magnetic attraction plate 150 is fixed to this opposite area. Similarly to the first embodiment, plural recessed portions may be formed separately from one another on the one surface of the base plate 140, or one recessed portion may be formed as a circumferential groove forming a circle on the one surface of the base plate 140. In the example of FIG. 8, the formation of the recessed portion 2 on the magnetic attraction plate placement surface was omitted and the coating film 3 was removed by cutting. However, similarly to the first embodiment, a recessed portion may be formed on the magnetic attraction plate placement surface to partially leave the coating film 3 after the cutting.

Subsequently, at Step S100 in FIG. 4, on the area including the recessed portion 2 (the opposite area where the recessed portion 2 has been formed), coating by, for example, epoxy electric discharge coating is carried out, and the recessed portion 2 formed on the vertical wall surface 155a of the base plate 140 is covered by the coating film 3, such as, for example, an epoxy electric discharge coating film.

Subsequently, the one surface of the base plate 140 is subjected to metal cutting by use of a machine tool. After the metal cutting, since the coating film 3 on the recessed portion 2 formed on the vertical wall surface 155a of the base plate 140 remains, a metal surface is exposed on the cut surface 5 of the base plate 140 but the coated area is formed on the recessed portion 2 formed in the area facing the magnetic attraction plate 150.

At subsequent Step S110, the coating film 3 on the recessed portion 2 that is the coated area of the base plate 140 and the cut surface 5 that is an uncoated area of the base plate 140 are bonded to the magnetic attraction plate 150 via the adhesive 4. Via the adhesive 4, the lateral surface of the magnetic attraction plate 150 is fixed to the opposite area of the vertical wall portion 155 that includes the recessed portion 2. As the adhesive 4, for example, an epoxy adhesive or an acrylic adhesive may be used.

In the second embodiment, at the one surface side of the base plate 140, the vertical wall surface 155a is formed, and the lateral surface of the magnetic attraction plate 150 is fixed to the above described opposite area via the adhesive 4. FIG. 8 is a drawing illustrating the bonding configuration between the base plate 140 and the magnetic attraction plate 150, according to the second embodiment.

As illustrated in FIG. 8, the lateral surface of the magnetic attraction plate 150 is bonded to the coating film 3 formed on the vertical wall portion 155 of the base plate 140 via the adhesive 4, and this contributes to the bonding strength between the base plate 140 and the magnetic attraction plate 150. Further, the lower surface and the lateral surface of the magnetic attraction plate 150 are bonded to the cut surface 5 formed on the one surface of the base plate 140 via the adhesive 4.

In this embodiment, a configuration in which the cut surface is formed in addition to the coated area at the one surface side of the base plate 140 (the configuration, in which the opposite area includes the cut surface), that is, the configuration in which the magnetic attraction plate 150 is fixed to both the electric discharge coated area and the uncoated area (for example, the cut surface) was described. In addition, a configuration in which the magnetic attraction plate 150 is fixed only to the electric discharge coated area (for example, a configuration where cutting on the opposite area of the base plate 140 is omitted) may also be suitably adopted.

As described above, the configuration according to the second embodiment also provides effects similar to those realized by the first embodiment because the lateral surface of the magnetic attraction plate 150 and the coating film 3 are bonded together via the adhesive.

Third Embodiment

In a third embodiment, the base plate 140 and the magnetic attraction plate 150 are bonded together by formation of a protruding portion on one surface of the base plate 140.

Figure 9:
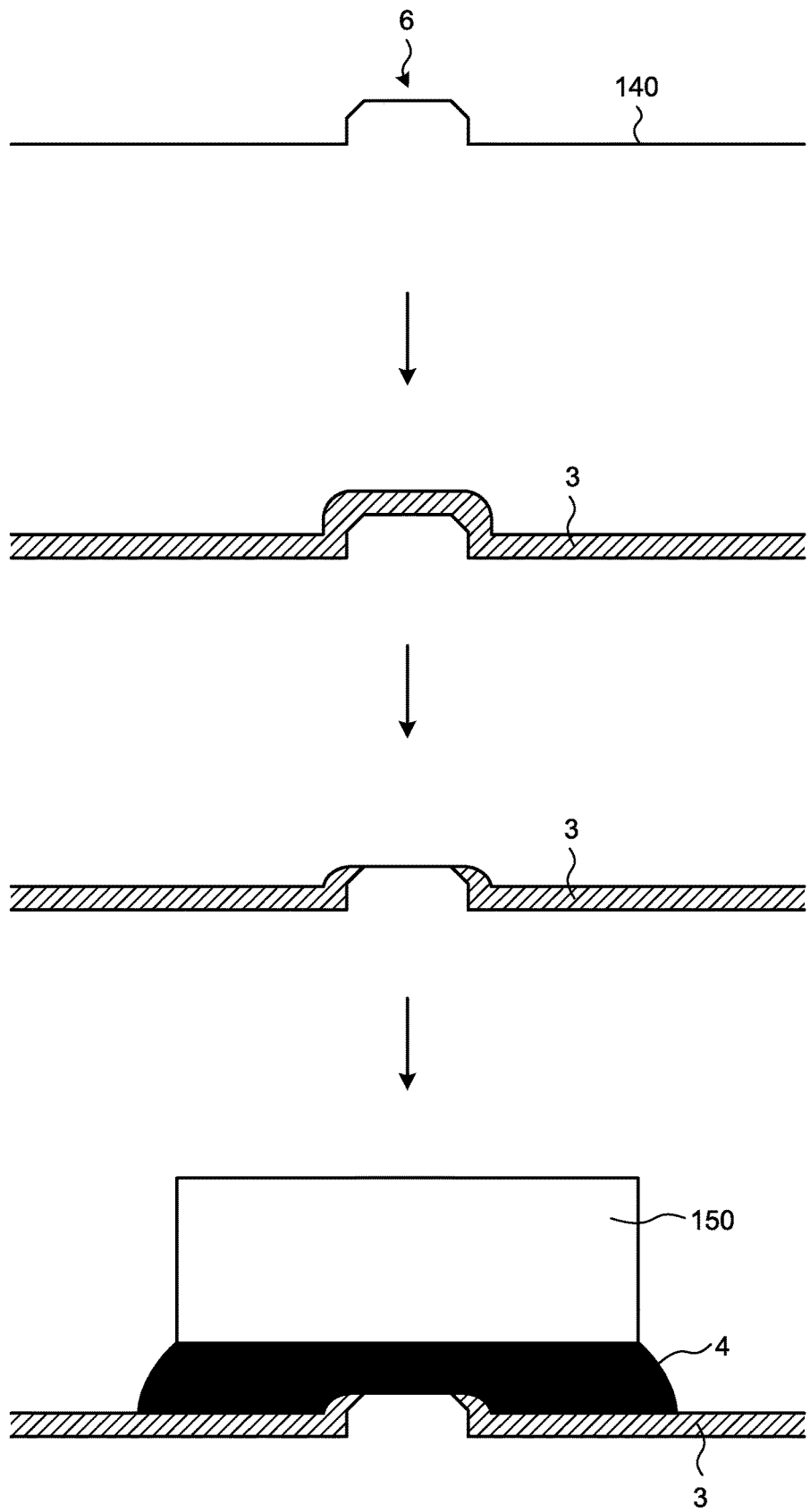
FIG. 9 illustrates a method of manufacturing a spindle motor according to a third embodiment.
Figure 10:
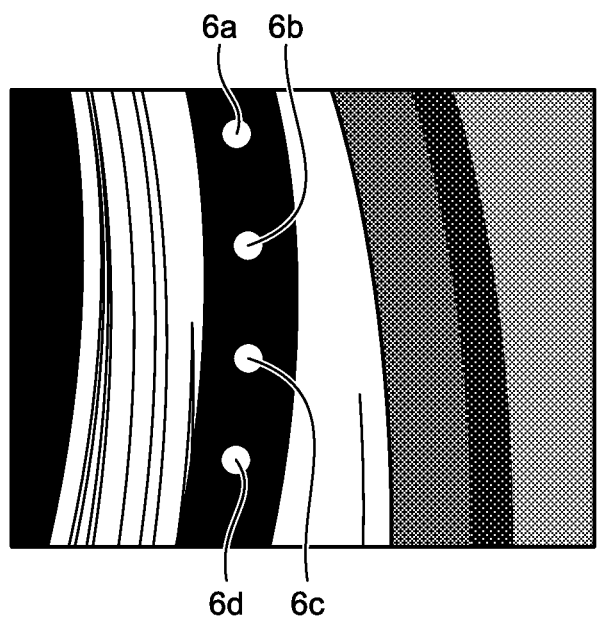
FIG. 10 illustrates an example of recessed portions formed on one surface of a base plate, according to the third embodiment.
Figure 11:
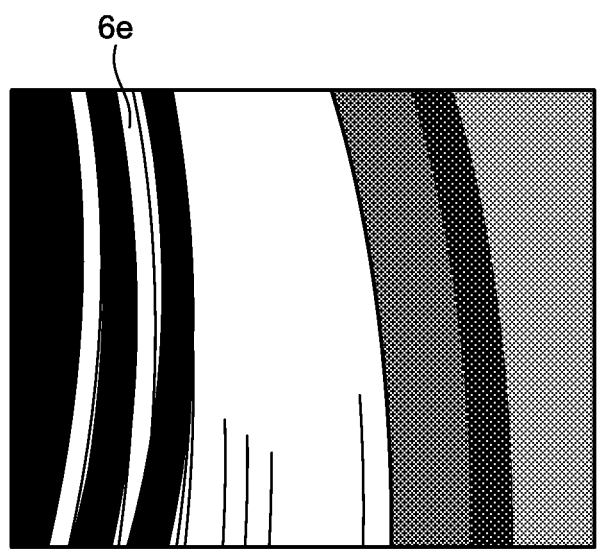
FIG. 11 illustrates an example of a recessed portion formed on the one surface of the base plate, according to the third embodiment.

A method of manufacturing the spindle motor 10 according to the third embodiment will be described. FIG. 9 illustrates the method of manufacturing the spindle motor according to the third embodiment. As a prerequisite, as illustrated in the figure at the uppermost stage in FIG. 9, one or more protruded portions 6 are formed on the one surface of the base plate 140. The protruded portions 6 are formed by, for example, die casting. As exemplified by FIG. 10, plural protruded portions 6 (protruded portions 6a to 6d) may be formed separately from one another on the one surface of the base plate 140, or as exemplified by FIG. 11, one protruded portion 6e may be formed as a protrusion that extends continuously in the circumferential direction along an entire circle on the one surface of the base plate 140.

Firstly, at Step S100 in FIG. 4, coating is carried out on an area including the protruded portion 6, and as illustrated in the figure at the second stage from the top in FIG. 9, the area including the protruded portion 6 is covered by the coating film 3. An area excluding the protruded portion 6 and covered by the coating film 3 is an example of the coated area on the base plate 140. This process is carried out by, for example, epoxy electric discharge coating, and the area other than the protruded portion 6 is covered by the coating film 3, which is an epoxy electric discharge coating film.

Subsequently, the one surface of the base plate 140 is subjected to metal cutting by use of a machine tool. The third stage from the top in FIG. 9 exemplifies a state, in which the protruded portion 6 has been subjected to cutting. The protruded portion 6 subjected to cutting is an example of an uncoated area on the base plate 140. Since the metal cutting is carried out on the protruded portion 6 while leaving the coating film 3 on the area other than the protruded portion 6 on the one surface of the base plate 140, a cut surface of the base plate 140 is exposed on the top surface of the protruded portion 6. As described before, the bond between the coating film 3 and the adhesive 4 is stronger than the bond between cut surface 5 and the adhesive 4. The coated area is formed on an opposite area that includes the protruded portion 6. However, the coated area does not include the protruded portion 6.

At subsequent Step S110, the coating film 3 that is the coated area on the base plate 140, and the protruded portion 6 are bonded to the magnetic attraction plate 150 via the adhesive 4. The coating film 3 corresponds to the area other than the protruded portion 6, and the protruded portion 6 corresponds to the area other than the coated area on the base plate 140. That is, in the opposite area including the coated area and the protruded portion 6, at least one of a lower surface and a lateral surface of the magnetic attraction plate 150 is fixed. Examples of the adhesive 4 that can be used are an epoxy adhesive and an acrylic adhesive. The figure at the lowermost stage in FIG. 9 exemplifies a state in which the area other than the protruded portion 6 and the protruded portion 6 have been bonded to the magnetic attraction plate 150 via the adhesive 4. The area other than the protruded portion 6 is the coated area on the base plate 140, and the protruded portion 6 is the area other than the coated area on the base plate 140.

Figure 12:
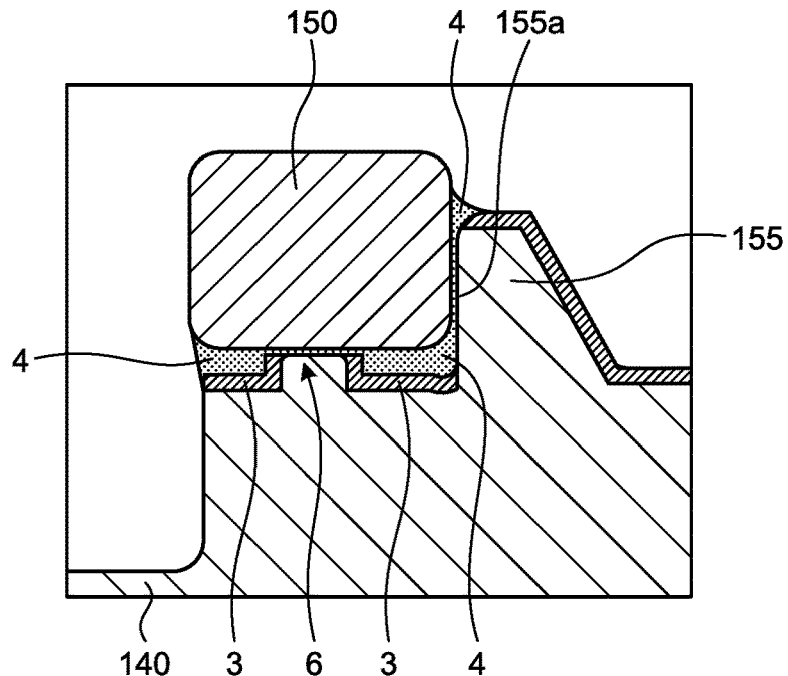
FIG. 12 illustrates a bonding configuration between the base plate and a magnetic attraction plate, according to the third embodiment.

FIG. 12 is an explanatory drawing for the bonding configuration between the base plate 140 and the magnetic attraction plate 150 according to the third embodiment. The lower surface of the magnetic attraction plate 150 is bonded, via the adhesive 4, to the coating film 3 formed on the area except the protruded portion 6 formed on a magnetic attraction plate placement surface of the base plate 140. As described above, the bonding strength between the coating film 3 and the adhesive 4 is high, and thus the base plate 140 and the magnetic attraction plate 150 are strongly bonded together. In addition, the lower surface of the magnetic attraction plate 150 is bonded also to the protruded portion 6 of the base plate 140 via the adhesive 4, and this also contributes to the bonding strength between the base plate 140 and the magnetic attraction plate 150.

As described above, the configuration according to the third embodiment also can provide effects similar to those realized by the first embodiment.

Fourth Embodiment

The first embodiment described the recessed portions formed on the magnetic attraction plate placement surface of the base plate 140, and the second embodiment described the recessed portion formed on the vertical wall portion 155 of the base plate 140. In a fourth embodiment, a case in which a recessed portion is formed extending continuously on both the magnetic attraction plate placement surface and the vertical wall portion of the base plate 140, and through both the magnetic attraction plate placement surface (lower surface) and the vertical wall portion, the base plate 140 and the magnetic attraction plate 150 are bonded together, will be described. Thereby, stabilization of bonding and increase in bonding strength are able to be realized.

Figure 13:
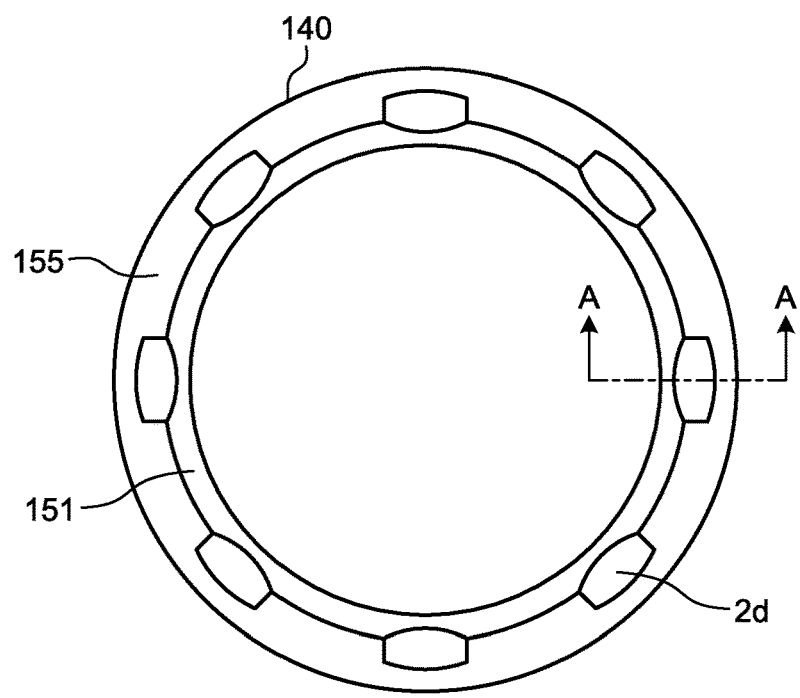
FIG. 13 is an example of a top view of an area where a magnetic attraction plate is fixed on the base plate, according to a fourth embodiment.

FIG. 13 is a top view illustrating a magnetic attraction plate placement surface 151 and the vertical wall portion 155 of the base plate 140 according to the fourth embodiment. By die casting, for example, two or more recessed portions 2d are formed on the base plate 140. The recessed portions 2d are formed extending from the magnetic attraction plate placement surface 151 to the vertical wall portion 155. The number, size, and shape of the recessed portions 2d are not limited to the number, size, and shape illustrated in FIG. 13. Further, by execution of epoxy electric discharge coating on one surface of the base plate 140 including the recessed portions 2d, the recessed portions 2d are covered by an epoxy electric discharge coating film.

Figure 14:
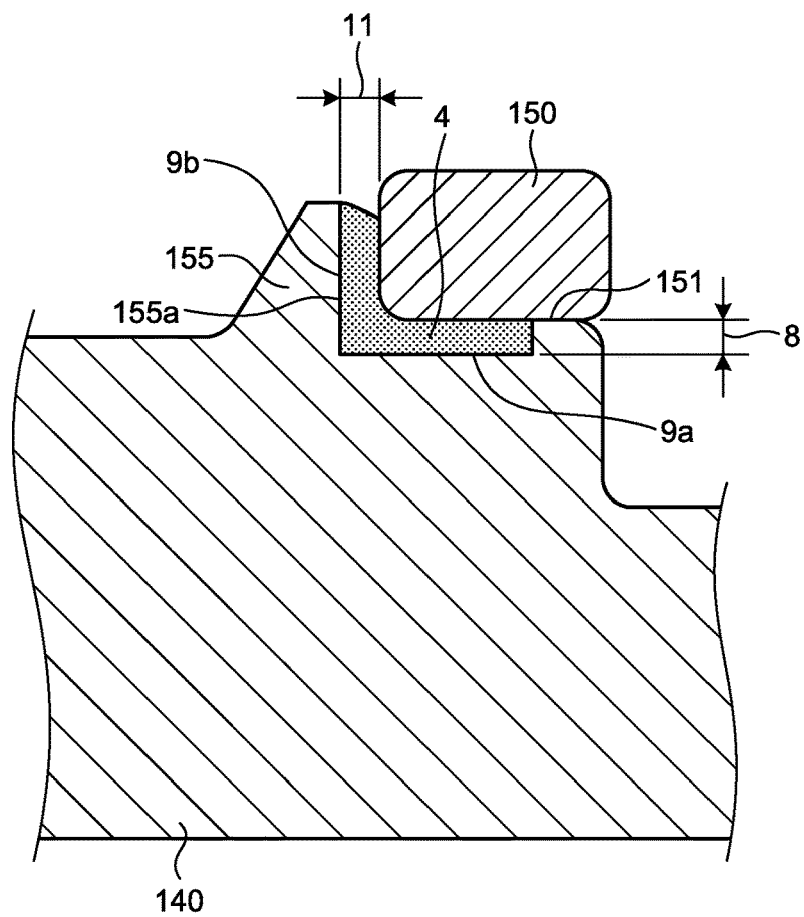
FIG. 14 illustrates an example of a recessed portion formed on one surface of the base plate, according to the fourth embodiment.

FIG. 14 is a sectional view at an A-A cross section in FIG. 13. A bottom surface 9a and a wall surface 9b respectively represent a bottom surface and a wall surface of the recessed portion 2d formed over the magnetic attraction plate placement surface 151 to the vertical wall portion 155, and the magnetic attraction plate 150 is fixed to the base plate 140 via the adhesive 4. A vertical clearance 8 is, for example, 0.03 mm to 0.2 mm, and a horizontal clearance 11 is, for example, 0.2 mm. In the second embodiment, the coated area is formed on the vertical wall portion 155, which is at the one surface side of the base plate 140 and extends toward the rotor assembly along the rotation axis direction of the rotor assembly (the rotor hub 120 and the like), and the lateral surface of the magnetic attraction plate 150 is fixed, via the adhesive 4, in the area where the vertical wall portion 155 and the magnetic attraction plate 150 face to each other. In the fourth embodiment, the coated area is further formed on a surface at the one surface side of the base plate 140 where a lower surface of the magnetic attraction plate 150 is arranged (that is, the magnetic attraction plate placement surface 151), and in an opposite area including this coated area, the lower surface of the magnetic attraction plate 150 is further fixed via the adhesive 4.

As described above, in the fourth embodiment, the base plate 140 and the magnetic attraction plate 150 are bonded together through the coated area extending over both the placement surface and the vertical wall surface 155a, and thus the bonding strength is increased. In addition, by the wedge effect of the adhesive 4 that has penetrated inside the recessed portions 2d, the bonding strength is further improved.

Figure 15:
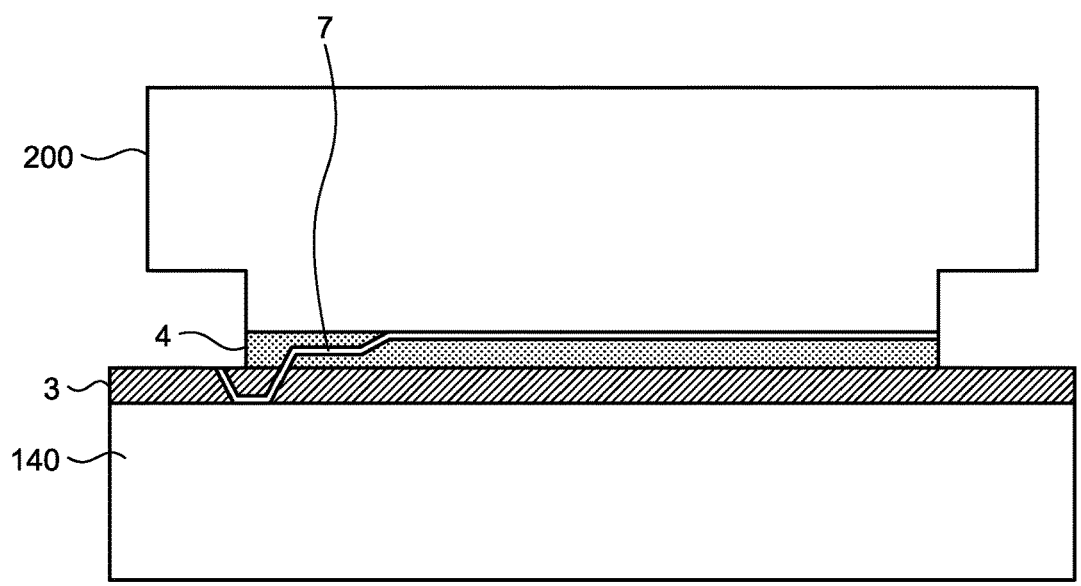
FIG. 15 is an explanatory drawing illustrating a result of experiments according to the embodiments.

In order to verify the bonding strength between the base plate 140 and the magnetic attraction plate 150 in the spindle motor 10 according to each of the above described first to fourth embodiments, peeling tests were carried out. FIG. 15 is an explanatory drawing illustrating a result of these experiments.

For simulating the bonding condition according to the embodiments, an epoxy electric discharge coating film was formed on the base plate 140 made of aluminum alloy, and bonding with an uncoated SUS member (stainless steel member) via the adhesive 4 was carried out. Subsequently, a peeling test, in which the SUS member was separated from the base plate 140 while the base plate 140 was fixed, was carried out for verifying on which of the base plate 140 (the epoxy electric discharge coating film side) and the SUS member (exposed metal side) the adhesive 4 remains more. As the adhesive 4, an epoxy adhesive or an acrylic adhesive was used. Four sets of peeling tests for the epoxy adhesive, and three sets of peeling tests for the acrylic adhesive were carried out. In each of the peeling tests, the bonded base plate 140 and SUS member were separated and the adhesive remaining on each of them was checked. The one with a larger amount of the remaining adhesive indicates that the adhesive is more strongly adhered to it.

In the four sets of peeling tests, in which the epoxy adhesive was used as the adhesive 4, 90%, 90%, 90%, and 90% of the adhesive 4 respectively remained on the base plate 140 side (the epoxy electric discharge coating film side). On the contrary, 10%, 10%, 10%, and 10% of the adhesive 4 respectively remained on the SUS member side. These residual rates of the adhesive 4 on the base plate 140 side and the SUS member side were approximately calculated by visual observation of the areas on the base plate 140 and on the SUS member where the adhesive 4 remained after the separation.

Further, in the three sets of peeling tests, in which the acrylic adhesive was used as the adhesive 4, 90%, 70%, and 90% of the adhesive 4 respectively remained on the base plate 140 side (the epoxy electric discharge coating film side). On the contrary, 10%, 30%, and 10% of the adhesive 4 respectively remained on the SUS member side. These residual rates of the adhesive 4 on the base plate 140 side and the SUS member side were calculated by visual observation, similarly to the case where the epoxy adhesive was used as the adhesive 4.

In FIG. 15, a typical surface of separation in a case where an epoxy adhesive is used as the adhesive 4 is schematically illustrated. A surface of separation 7 represents the typical surface of separation in a peeling test for the adhesive 4 bonding the coating film 3 coated on a surface of the base plate 140 and the SUS member 200. As illustrated in FIG. 15, peeling mostly occurred between the exposed metal surface of the SUS member 200 and the adhesive 4, and peeling was hardly observed between the coating film 3 and the adhesive 4. From this observation, it was confirmed that the bonding strength between the coating film 3 and the adhesive 4 is at least higher than the bonding strength between the adhesive 4 and the metal surface.

When the acrylic adhesive was used as the adhesive 4 also, peeling hardly occurred between the coating film 3 and the adhesive 4. However, in the above mentioned second set, partial peeling was observed between the coating film 3 and the adhesive 4. From this result, it can be concluded that the bonding strength between the coating film 3 and the adhesive 4 is still satisfactory when an acrylic adhesive is used as the adhesive 4, but stronger bond is obtained when an epoxy adhesive is used as the adhesive 4.

OTHER EMBODIMENTS

The case where a recessed portion is formed on one surface of the base plate 140 was described in the first, second, and fourth embodiments, and the case where a protruded portion is formed on one surface of the base plate 140 was described in the third embodiment. However, the embodiments are not limited to these cases. For example, without formation of a protruded portion or a recessed portion on one surface of the base plate 140, a coated area and an uncoated area may be formed on one flat surface of the base plate 140. Further, in each of the embodiments, the case where the base plate 140 and the magnetic attraction plate 150 are bonded together was described. However, the embodiments are not limited to this case and are applicable to other members.

In FIG. 12, the lateral surface of the magnetic attraction plate 150 may be or may not be bonded to the base plate 140 via the adhesive 4. Further, on one surface of the vertical wall portion 155 facing the lateral surface of the magnetic attraction plate 150, at least one of a protruded portion and a recessed portion may be further formed, and similarly, a coated area where the coating film 3 partially remains may be formed, and bonding may be carried out.

According to an aspect of the present invention, bonding strength between a base plate and a magnetic attraction plate is able to be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A spindle motor including:
   a base plate;
   a rotor magnet fixed to a rotor assembly positioned at one surface side of the base plate; and
   a magnetic attraction plate fixed at the one surface side of the base plate to an opposite area of the base plate which faces the magnetic attraction plate, so as to face the rotor magnet; wherein
   the opposite area of the base plate facing the magnetic attraction plate includes a coated area covered by an epoxy electric discharge coating film,
   the magnetic attraction plate is fixed to the opposite area via at least one of an epoxy adhesive and an acrylic adhesive, and
   the epoxy electric discharge coating film and the at least one of an epoxy adhesive and an acrylic adhesive are jointly configured to provide a greater bonding strength between the magnetic attraction plate and the base plate than use of at least one of an epoxy adhesive and an acrylic adhesive without use of the epoxy electric discharge coating film.

2. The spindle motor according to claim 1, wherein a lower surface of the magnetic attraction plate is fixed to the opposite area.

3. The spindle motor according to claim 2, wherein a protruded portion is formed on the opposite area, the protruded portion including a top surface uncovered by the epoxy electric discharge coating film, and the lower surface of the magnetic attraction plate is fixed to the opposite area including the protruded portion.

4. The spindle motor according to claim 2, wherein a recessed portion is formed on the opposite area, the recessed portion being covered entirely by the epoxy electric discharge coating film, and the lower surface of the magnetic attraction plate is fixed to the opposite area including the recessed portion.

5. The spindle motor according to claim 1, wherein
   a wall surface of a protruded portion extending toward the rotor assembly along a rotation axis direction of the rotor assembly is formed at the one surface side of the base plate;
   the opposite area on the wall surface further includes a coated area covered by an epoxy electric discharge coating film and an exposed metal surface;
   a lateral surface of the magnetic attraction plate is fixed to the opposite area on the wall surface, and the magnetic attraction plate is fixed to both of the coated area and the exposed metal surface included in the opposite area.

6. The spindle motor according to claim 5, wherein a recessed portion is formed on the opposite area, the recessed portion being covered entirely by the epoxy electric discharge coating film, and the lateral surface of the magnetic attraction plate is fixed to the opposite area including the recessed portion.

7. The spindle motor according to claim 1, wherein at the one surface side of the base plate, an exposed metal surface is formed in addition to the coated area and the opposite area further includes the exposed metal surface, and
the magnetic attraction plate is fixed to both of the coated area and the exposed metal surface included in the opposite area.

8. A hard disk drive device comprising the spindle motor according to claim 1.

9. The spindle motor according to claim 1, wherein the opposite area presents inside the spindle motor.

10. A method of manufacturing a spindle motor comprising:
a base plate, a rotor magnet fixed to a rotor assembly positioned at one surface side of the base plate, and a magnetic attraction plate fixed at the one surface side of the base plate so as to face the rotor magnet, the method including:
forming a coated area covered by an epoxy electric discharge coating film at the one surface side of the base plate;
partially removing the epoxy electric discharge coating film in an opposite area facing the magnetic attraction plate to form an exposed metal surface; and
fixing the magnetic attraction plate to the opposite area of the base plate via at least one of an epoxy adhesive and an acrylic adhesive, the opposite area facing the magnetic attraction plate and including the coated area and the exposed metal surface, wherein
the epoxy electric discharge coating film and the at least one of an epoxy adhesive and an acrylic adhesive are jointly configured to provide a greater bonding strength between the magnetic attraction plate and the base plate than use of at least one of an epoxy adhesive and an acrylic adhesive without use of the epoxy electric discharge coating film.

11. The method of manufacturing the spindle motor according to claim 10, wherein the fixing fixes the magnetic attraction plate to both of the coated area and the exposed metal surface included in the opposite area.

12. The method of manufacturing the spindle motor according to claim 10, wherein the opposite area presents inside the spindle motor.

* * * * *